US012375497B2

(12) United States Patent
Armada

(10) Patent No.: US 12,375,497 B2
(45) Date of Patent: *Jul. 29, 2025

(54) AUTOMATED USER PROFILE PROVISIONING IN MULTI-TENANT CLOUD NETWORKS

(71) Applicant: Netskope, Inc., Santa Clara, CA (US)

(72) Inventor: Daniel Armada, Mataro (ES)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,393

(22) Filed: Mar. 5, 2024

(65) Prior Publication Data

US 2024/0275792 A1    Aug. 15, 2024

Related U.S. Application Data

(63) Continuation of application No. 18/078,806, filed on Dec. 9, 2022, now Pat. No. 11,924,220, which is a
(Continued)

(51) Int. Cl.
*H04L 9/40*       (2022.01)
*G06F 16/27*      (2019.01)

(52) U.S. Cl.
CPC ............ *H04L 63/104* (2013.01); *G06F 16/27* (2019.01); *H04L 63/20* (2013.01)

(58) Field of Classification Search
CPC ........ H04L 63/104; H04L 63/20; G06F 16/27
See application file for complete search history.

(56) References Cited

U.S. PATENT DOCUMENTS

| 5,440,723 A | 8/1995 | Arnold et al. |
| 6,513,122 B1 | 1/2003 | Magdych et al. |

(Continued)

FOREIGN PATENT DOCUMENTS

| CA | 2443337 A1 | 4/2004 |
| EP | 0605106 A1 | 7/1994 |

(Continued)

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Khoi V Le
(74) *Attorney, Agent, or Firm* — MUGHAL GAUDRY & FRANKLIN PC

(57) ABSTRACT

A cloud network for automatically provisioning of user and group profiles in multi-tenant systems. It involves a plurality of end-user devices, each equipped with a local application and user interface, and a mid-link server that orchestrates the provisioning process. The mid-link server facilitates the creation of configuration snippets for user directories via the user interface, retrieves user and group policies from a central policy store, and dynamically filters these policies based on threat information obtained from a threat identifier. In response to identified high-risk users, the system assigns them to high-risk groups with reduced privileges, ensuring enhanced security measures. The filtered policies, along with high-risk user identification, are then passed to a snippet generator for deployment. The system resolves conflicts between user and group policies by prioritizing end-user tasks and specific user/group requirements.

20 Claims, 10 Drawing Sheets

Related U.S. Application Data continuation of application No. 17/454,764, filed on Nov. 12, 2021, now Pat. No. 11,528,279.

(56) References Cited

U.S. PATENT DOCUMENTS

| | | | |
|---|---|---|---|
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,244,777 B1 | 8/2012 | Vijendra et al. | |
| 8,296,178 B2 | 10/2012 | Hudis et al. | |
| 8,375,136 B2 | 2/2013 | Roman et al. | |
| 8,793,151 B2 | 7/2014 | DelZoppo et al. | |
| 8,839,417 B1 | 9/2014 | Jordan | |
| 8,887,286 B2 | 11/2014 | Dupont et al. | |
| 8,935,365 B1 | 1/2015 | Levin et al. | |
| 9,191,380 B2 | 11/2015 | Anderson et al. | |
| 9,197,601 B2 | 11/2015 | Pasdar | |
| 9,225,734 B1 | 12/2015 | Hastings | |
| 9,231,968 B2 | 1/2016 | Fang et al. | |
| 9,280,678 B2 | 3/2016 | Redberg | |
| 9,811,662 B2 | 11/2017 | Sharpe et al. | |
| 9,848,330 B2 | 12/2017 | Kaufman et al. | |
| 10,084,825 B1 | 9/2018 | Xu | |
| 10,122,757 B1 | 11/2018 | Kruse et al. | |
| 10,237,282 B2 | 3/2019 | Nelson et al. | |
| 10,334,442 B2 | 6/2019 | Vaughn et al. | |
| 10,382,468 B2 | 8/2019 | Dods | |
| 10,411,951 B2 | 9/2019 | Clark et al. | |
| 10,484,334 B1 | 11/2019 | Lee et al. | |
| 10,826,941 B2 | 11/2020 | Jain et al. | |
| 10,949,528 B1 | 3/2021 | Attfield et al. | |
| 10,986,131 B1 | 4/2021 | Kruse et al. | |
| 11,032,301 B2 | 6/2021 | Mandrychenko et al. | |
| 11,036,856 B2 | 6/2021 | Graun et al. | |
| 11,159,576 B1* | 10/2021 | Ly | H04L 63/0245 |
| 11,281,775 B2 | 3/2022 | Burdett et al. | |
| 2002/0099666 A1 | 7/2002 | Dryer et al. | |
| 2002/0147801 A1* | 10/2002 | Gullotta | H04L 41/0894 379/201.12 |
| 2003/0055994 A1 | 3/2003 | Herrmann et al. | |
| 2003/0063321 A1 | 4/2003 | Inoue et al. | |
| 2003/0172292 A1 | 9/2003 | Judge | |
| 2003/0204632 A1 | 10/2003 | Willebeek-Lemair et al. | |
| 2004/0015719 A1 | 1/2004 | Lee et al. | |
| 2005/0010593 A1 | 1/2005 | Fellenstein et al. | |
| 2005/0271246 A1 | 12/2005 | Sharma et al. | |
| 2006/0156401 A1 | 7/2006 | Newstadt et al. | |
| 2007/0204018 A1 | 8/2007 | Chandra et al. | |
| 2007/0237147 A1 | 10/2007 | Quinn et al. | |
| 2008/0022392 A1 | 1/2008 | Karpati et al. | |
| 2008/0069480 A1 | 3/2008 | Aarabi et al. | |
| 2008/0126287 A1 | 5/2008 | Cox et al. | |
| 2008/0126349 A1 | 5/2008 | Venkatraman et al. | |
| 2008/0134332 A1 | 6/2008 | Keohane et al. | |
| 2008/0155641 A1 | 6/2008 | Beavin et al. | |
| 2008/0301757 A1 | 12/2008 | Demarest et al. | |
| 2009/0144818 A1 | 6/2009 | Kumar et al. | |
| 2009/0249470 A1 | 10/2009 | Litvin et al. | |
| 2009/0300351 A1 | 12/2009 | Lei et al. | |
| 2010/0017436 A1 | 1/2010 | Wolge | |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0086260 A1 | 4/2013 | Biazetti et al. | |
| 2013/0159694 A1 | 6/2013 | Chiueh et al. | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0259093 A1 | 9/2014 | Narayanaswamy et al. | |
| 2014/0282843 A1 | 9/2014 | Buruganahalli et al. | |
| 2014/0359282 A1 | 12/2014 | Shikfa et al. | |
| 2014/0366079 A1 | 12/2014 | Pasdar | |
| 2015/0100357 A1 | 4/2015 | Seese et al. | |
| 2015/0249623 A1 | 9/2015 | Phillips et al. | |
| 2016/0323318 A1 | 11/2016 | Terrill et al. | |
| 2016/0330246 A1 | 11/2016 | Narayanaswamy et al. | |
| 2016/0350145 A1 | 12/2016 | Botzer et al. | |
| 2016/0379007 A1 | 12/2016 | Burge | |
| 2017/0064005 A1 | 3/2017 | Lee | |
| 2017/0093917 A1 | 3/2017 | Chandra et al. | |
| 2017/0250951 A1 | 8/2017 | Wang et al. | |
| 2018/0069899 A1* | 3/2018 | Lang | G06F 40/186 |
| 2018/0083967 A1* | 3/2018 | Subramanian | H04L 63/10 |
| 2020/0050686 A1 | 2/2020 | Kamalapuram et al. | |

FOREIGN PATENT DOCUMENTS

| | | |
|---|---|---|
| EP | 1063833 A2 | 12/2000 |
| EP | 2880837 A2 | 6/2015 |
| WO | 2022165061 A1 | 8/2022 |
| WO | 2022226208 A1 | 10/2022 |
| WO | 2022246131 A1 | 11/2022 |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.

(56) References Cited

OTHER PUBLICATIONS techtarget.com/searchsecurity/tip/Firewall-redundancy-Deployment-scenarios-and-benefits?%20Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," filed Nov. 17, 2003, 21 pgs.
U.S. Appl. No. 60/552,457, "Fortinet Security Update Technology," filed Mar. 2004, 6 pgs.
Tittel, Ed, Unified Threat Management for Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

AUTOMATED USER PROFILE PROVISIONING IN MULTI-TENANT CLOUD NETWORKS

PRIORITY

This application is a continuation of U.S. application Ser. No. 18/078,806, filed Dec. 9, 2022, now U.S. Pat. No. 11,924,220, issued Mar. 5, 2024, which is a continuation of U.S. application Ser. No. 17/454,764, filed Nov. 12, 2021, now U.S. Pat. No. 11,528,279, issued Dec. 13, 2022, the disclosures of which are hereby incorporated by reference herein in their entirety for all purposes.

SUMMARY

In one embodiment, a cloud network for automatically provisioning of user and group profiles in multi-tenant systems. It involves a plurality of end-user devices, each equipped with a local application and user interface, and a mid-link server that orchestrates the provisioning process. The mid-link server facilitates the creation of configuration snippets for user directories via the user interface, retrieves user and group policies from a central policy store, and dynamically filters these policies based on threat information obtained from a threat identifier. In response to identified high-risk users, the system assigns them to high-risk groups with reduced privileges, ensuring enhanced security measures. The filtered policies, along with high-risk user identification, are then passed to a snippet generator for deployment. The system resolves conflicts between user and group policies by prioritizing end-user tasks and specific user/group requirements.

In another embodiment, a cloud network for automatically provisioning of user and group profiles using directory synchronization in a multi-tenant system. The cloud network includes a plurality of end-user devices, an end-user device includes a local application and a user interface, and a mid-link server coupled to the plurality of the end-user devices. The mid-link server is configured to create a snippet for a configuration of a user directory via the user interface, retrieve user and group policies from a policy store, receive from a threat identifier, threat information associated with an end-user and filter these policies based on threat information obtained from a threat identifier. A high-risk user is identified from the plurality of end-users based on the threat information and the high-risk user is assigned to a high-risk group with a lower set of privileges for the configuration of the user directory for the end-user. The filtered user policies or the group policies are provided along with an identification of the high-risk user to a snippet generator. The user directory is deployed using the snippet. The configuration of the user directory is based on the user policies and the group policies. A conflict between the user policies and the group policies is identified. The user policies or the group policies are adjusted based on a priority of end-user tasks or specific user/group requirements to resolve the conflict between the user policies and the group policies.

In another embodiment, a method is disclosed for automatically provisioning user and group profiles using directory synchronization within a multi-tenant system. Initially, a mid-link server creates configuration snippets for user directories via a user interface for each end-user. User and group policies are retrieved from a policy store. Threat information associated with an end-user is received and the user policies or the group policies are filtered based on threat information obtained from a threat identifier. A high-risk user is identified from the plurality of end-users based on the threat information and the high-risk user is assigned to a high-risk group with a lower set of privileges for the configuration of the user directory for the end-user. The filtered user policies or the group policies are provided along with an identification of the high-risk user to a snippet generator. The user directory is deployed using the snippet. The configuration of the user directory is based on the user policies and the group policies. A conflict between the user policies and the group policies is identified. The user policies or the group policies are adjusted based on a priority of end-user tasks or specific user/group requirements to resolve the conflict between the user policies and the group policies.

In another embodiment, a cloud network system is disclosed for automatically provisioning user and group profiles using directory synchronization within a multi-tenant environment. The system encompasses a plurality of servers collectively hosting code responsible for:
creating, by a mid-link server, a snippet for a configuration of a user directory using a user interface for each of a plurality of end-users;
retrieving, by the mid-link server, user policies and group policies associated with the plurality of end-users from a policy store;
receiving, by the mid-link server, from a threat identifier, threat information associated with an end-user;
filtering, by the mid-link server, the user policies or the group policies based on the threat information;
identifying, by the mid-link server, a high-risk user from the plurality of end-users based on the threat information and assign the high-risk user to a high-risk group with a lower set of privileges for the configuration of the user directory for the end-user; and
providing, by the mid-link server, the filtered user policies or the group policies with an identification of the high-risk user to a snippet generator;
deploying, by the mid-link server, the user directory using the snippet, wherein the configuration of the user directory is based on the user policies and the group policies; and
identifying, by the mid-link server, a conflict between the user policies and the group policies, wherein the user policies or the group policies are adjusted based on a priority of end-user tasks or specific user/group requirements to resolve the conflict between the user policies and the group policies.

BACKGROUND

This disclosure relates in general to a user directory synchronization and, but not by way of limitation, to automatic user directory synchronization and policy deployment, among other things.

Automating an exchange of user identity information between identity domains, or IT systems and directory synchronization using SCIM (System for Cross-domain Identity Management) is popular among customers, mainly due to its minimal footprint on the customers' infrastructure. SCIM integrations don't require an installation of any software on any customer side. SCIM are software applications created within the customers' IdP (Identity Provider). However, the SCIM integrations have slow activation and directory synchronizations in production environments.

Moreover, Sales Engineers (SEs) takes more time in their Proof of Concepts (POCs), and working in this area makes it difficult for the SEs to focus on the customer regarding features that can generate a sale. Currently no software allows the customers to quickly integrate a snippet of the customer's directory without any software or hardware requirement in POCs or production activations, or to do a complete SCIM directory troubleshooting with minimal technical skills.

When using Representational State Transfer (REST) Application Programming Interface (API) calls of SCIM, all the interaction is based on SCIM Identifiers. For example, unique identifiers, that are 128-bit numbers, and are far more complex. Much more friendly parameters are needed for interaction to make the directory synchronization and activation much faster.

SUMMARY

In one embodiment, the present disclosure provides a cloud network for automatically provisioning a user directory in a multi-tenant system. The cloud network includes a local application that executes on an end-user device and a mid-link server coupled to a plurality of end-user devices. User attributes for configuration of the user directory and groups associated with the plurality of end-users is received from the local application. A program module integrates with an external application and the user interface allows integration with the mid-link server. A snippet is created for the configuration of the user directory from the user interface for each of the plurality of end-users. User policies and group policies associated with the plurality of end-users are determined. A high-risk user from the plurality of end-users is determined using the external application. The user directory is deployed using the snippet based on the user policies and the group policies.

In an embodiment, a cloud network for automatically provisioning user and group profiles using directory synchronization in a multi-tenant system is disclosed. The cloud network includes a local application configured to execute on an end-user device and a mid-link server coupled to a plurality of end-user devices. The local application is further configured to provide a plurality of user attributes for configuration of a user directory. The plurality of user attributes includes email address, User Principal Name (UPN), and/or username of a plurality of end-users is provided. A plurality of groups associated with the plurality of end-users is provided. The mid-link server is configured to interact with a program module and a user interface. The program module integrates with an external application and the user interface allows integration with the mid-link server. The user interface leverages the program module. A snippet is created for the configuration of the user directory from the user interface for each of the plurality of end-users. A set of user policies associated with the plurality of end-users and a set of group policies associated with the plurality of groups are determined by the mid-link server. A high-risk user from the plurality of end-users is determined using the external application and the high-risk user is added to a group of high-risk users assigned with a lower set of privileges for the configuration. Specific policies are applied for the high-risk user. A higher set of privileges for the configuration to the plurality of end-users excluding the high-risk user is assigned by the mid-link server. The user directory is deployed by the mid-link server using the snippet based on the set of user policies and the set of group policies. The configuration of the user directory is based on the set of user policies and the set of group policies.

In another embodiment, a method for automatically configuring user directory based on user and group policies in a multi-tenant system. In one step, a plurality of user attributes for configuration of a user directory is acquired. The plurality of user attributes includes email address, User Principal Name (UPN), and/or username of a plurality of end-users. A plurality of groups associated with the plurality of end-users is acquired. Interaction is made with a mid-link server using a program module and a user interface. The program module integrates with an external application and the user interface allows integration with the mid-link server. The user interface leverages the program module. A snippet is created for the configuration of the user directory using the user interface for each of the plurality of end-users. A set of user policies associated with the plurality of end-users and a set of group policies associated with the plurality of groups is determined by the mid-link server. A high-risk user is determined by the mid-link server using the external application from the plurality of end-users. The high-risk user is added to a group of high-risk users assigned with a lower set of privileges for the configuration. Specific policies are applied for the high-risk user. A higher set of privileges for the configuration to the plurality of end-users excluding the high-risk user is assigned by the mid-link server. The user directory is deployed using the snippet based on the set of user policies and the set of group policies. The configuration of the user directory is based on the set of user policies and the set of group policies.

In yet another embodiment, a cloud network for policy based provisioning of user directory using a program and an interface, the cloud network comprising a plurality of servers, collectively having code for:

acquiring a plurality of user attributes for configuration of a user directory, wherein the plurality of user attributes includes email address, User Principal Name (UPN), and/or username of a plurality of end-users;

acquiring a plurality of groups associated with the plurality of end-users;

interacting with a mid-link server using a program module and a user interface; wherein: the program module integrates with an external application, and the user interface allows integration with the mid-link server, and the user interface leverages the program module;

creating a snippet for the configuration of the user directory using the user interface for each of the plurality of end-users;

determining by the mid-link server, a set of user policies associated with the plurality of end-users;

determining by the mid-link server, a set of group policies associated with the plurality of groups;

determining by the mid-link server using the external application, a high-risk user from the plurality of end-users and adding the high-risk user to a group of high-risk users assigned with a lower set of privileges for the configuration, wherein specific policies are applied for the high-risk user;

assigning by the mid-link server, a higher set of privileges for the configuration to the plurality of end-users excluding the high-risk user; and deploying by the mid-link server, the user directory using the snippet based on the set of user policies and the set of group policies, wherein the configuration of the user directory is based on the set of user policies and the set of group policies.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
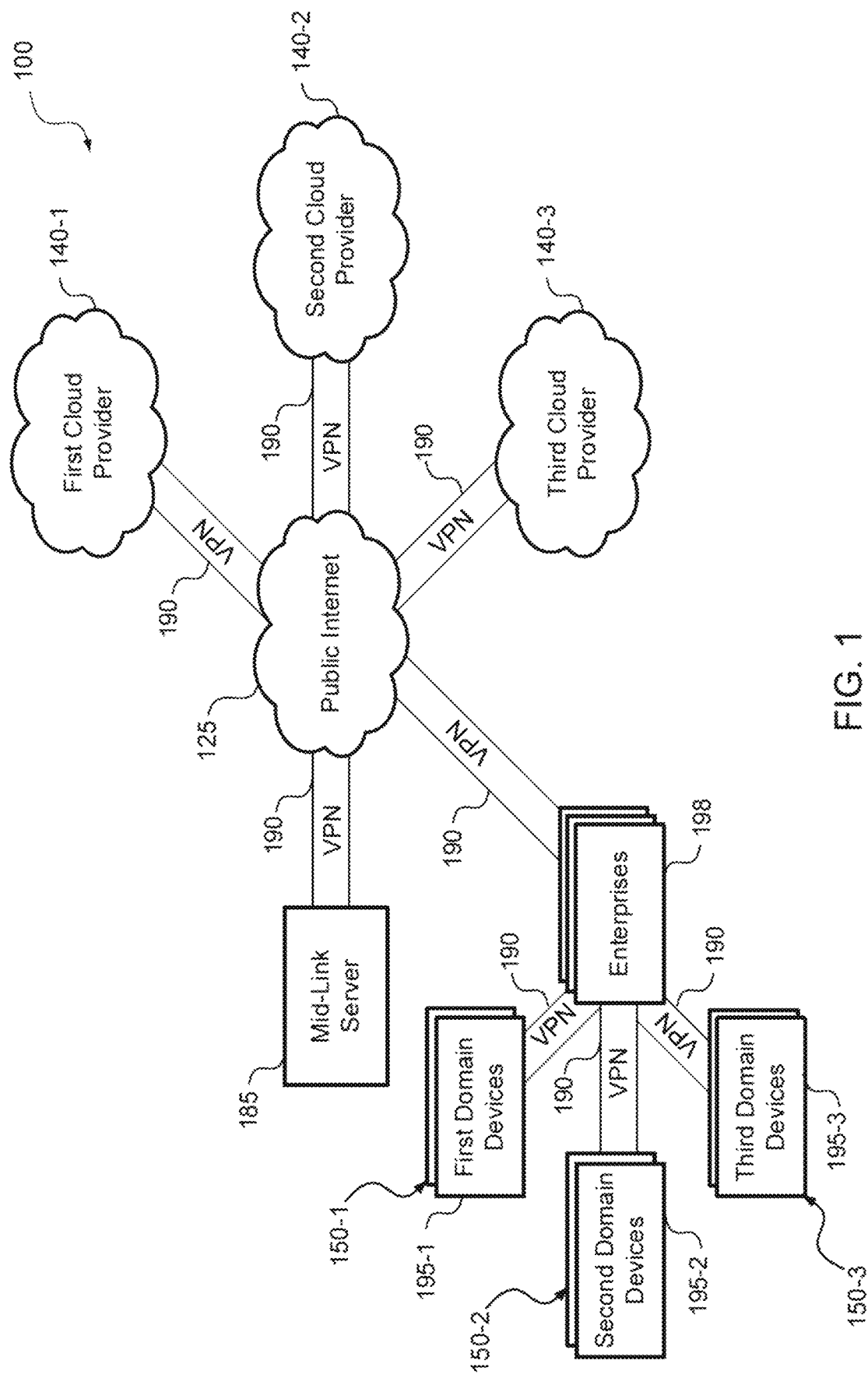
FIG. 1 illustrates a block diagram of an embodiment of a cloud network.

Referring first to FIG. 1, a block diagram of an embodiment of a cloud network 100 allowing multiple-tenants in different domains to communicate with various cloud providers over the public internet is shown. The cloud network 100 allows multiple tenants/multi-tenant systems or enterprises to use the same network separated by domain or some other logical separation. Encryption, leased/encrypted tunnels, firewalls, and/or gateways can be used to keep the data from one enterprise 198 separate from other enterprise(s) 198. Each end-user device 195 can communicate with cloud provider(s) 140 of services and storage using the Public Internet 125. A mid-link server 185 provides multi-tenancy control, policies and routing for each domain. The cloud network 100 can include a plurality of servers.

The cloud network 100 can include a first computing environment 150-1 having end-user devices 195-1 for a first domain, a second computing environment 150-2 having end-user devices 195-2 for a second domain, and a third computing environment 150-3 having end-user devices 195-3 for a third domain. Each domain communicates with its respective enterprise 198 using a virtual private network (VPN) 190 over local area networks (LANs), wide area networks (WANs), and/or the public Internet 125. Instead of a VPN 190 as an end-to-end path, tunneling (e.g., Internet Protocol in Internet Protocol (IP-in-IP), Generic Routing Encapsulation (GRE)), policy-based routing (PBR), Border Gateway Protocol (BGP)/Interior Gateway Protocol (IGP) route injection, or proxies could be used. The first cloud provider 140-1, the second cloud provider 140-2, and the third cloud provider 140-3 may be public or private clouds. Some examples of the cloud providers 140 include Amazon Web Services (AWS)®, Google Cloud Platform (GCP)®, and Microsoft Azure®. Some or all of the cloud providers 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud providers 140 are shown, any suitable number of cloud providers 140 may be provided with some captive to a particular enterprise or otherwise not accessible to multiple domains.

Each of the cloud providers 140 may communicate with the Public Internet 125 using a secure connection. For example, the first cloud provider 140-1 can communicate with the Public Internet 125 via a virtual private network (VPN) 190, the second cloud provider 140-2 can communicate with the Public Internet 125 via a different VPN 190, and the third cloud provider 140-3 can communicate with the Public Internet 125 via yet another VPN 190. Some embodiments could use leased connections or physically separated connections to segregate traffic. Although one VPN 190 is shown, it is to be understood that there are many VPNs to support different end-user devices, tenants, domains, etc.

A plurality of enterprises 198 can also communicate with the Public Internet 125 and the end-user devices 195 for their domain via VPNs 190. Some examples of the enterprises 198 may include corporations, educational facilities, governmental entities, and private consumers. Each enterprise may support one or more domains to logically separate their networks. The end-user devices 195 for each domain may include individual computers, tablets, servers, handhelds, and network infrastructure that are authorized to use computing resources of their respective enterprise 198.

Further, the mid-link server 185 can communicate with the Public Internet 125 via a VPN 190. The mid-link server 185 also provides cloud access security broker (CASB) functionality for cloud security to the enterprises 198 with data flows of the CASB being regulated with a global cloud traffic controller (GCTC). Communication between the mid-link server 185 and the cloud providers 140 for a given enterprise 198 can be either a VPN connection or tunnel depending on preference of the enterprise 198. The mid-link server 185 can configure, test, and enforce user and/or group policies and routing across the cloud network 100. For example, the mid-link server 185 can ensure that the policies are consistent across the cloud providers 140, enterprises 198 and computing environments 150. The mid-link server 185 provides proxies to cloud providers and can apply various policies. The connection between end-user devices 195 and the mid-link server 185 is over an encrypted VPN or tunnel. The cloud network 100 provides for policy based provisioning of user directory using a program and an interface.

Figure 2:
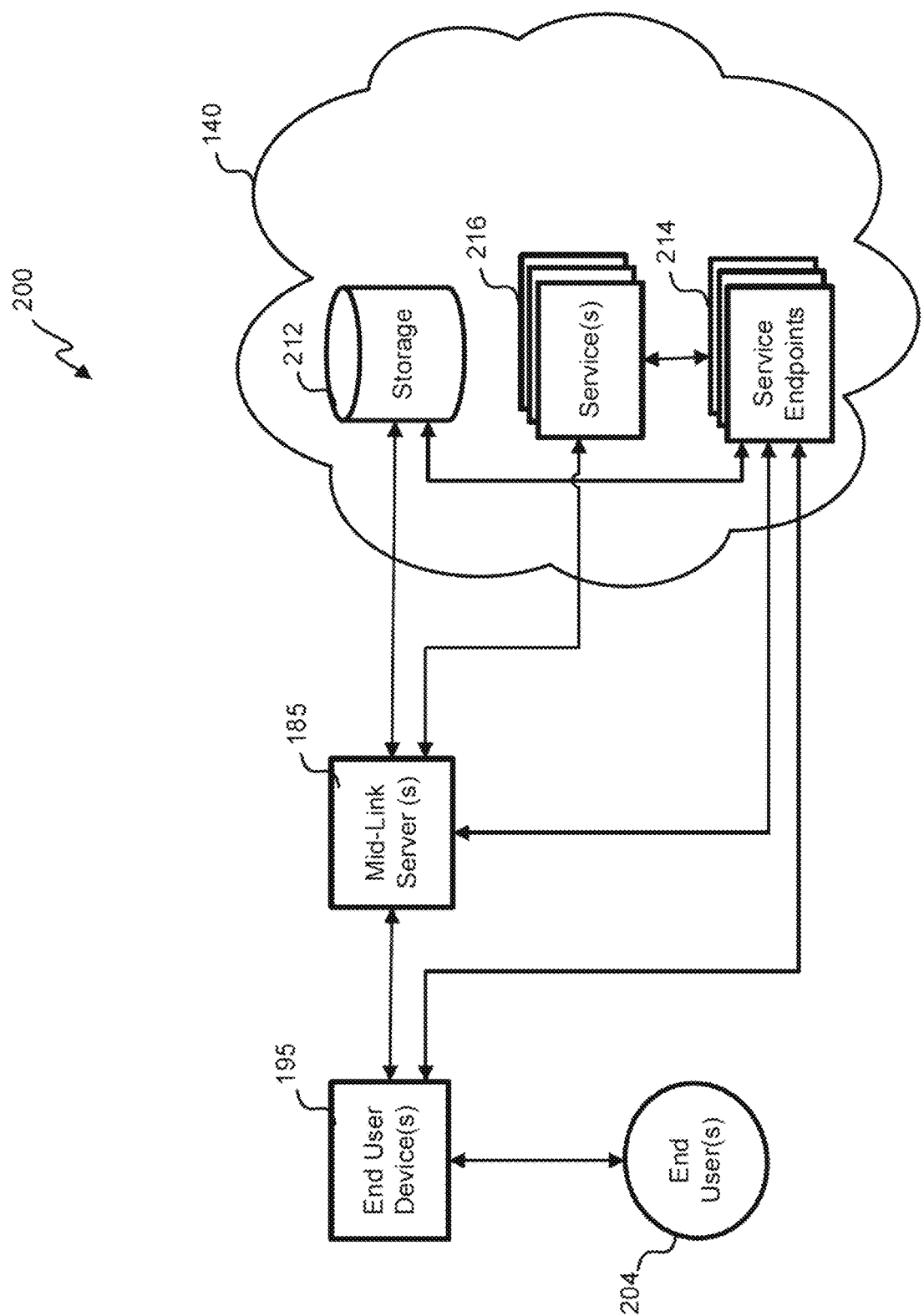
FIG. 2 illustrates a block diagram of an embodiment of a single-tenant cloud network where an end-user device communicates with a cloud provider.

With reference to FIG. 2, a block diagram of an embodiment of a single-tenant cloud network 200 where an end-user device 195 communicates with a cloud provider 140 is shown. The end-user device 195 is operated by an end-user 204. The cloud provider 140 is accessible directly or through the mid-link server 185 depending on the route chose, services, policies, etc. Included in the cloud provider 140 are services 216 such as storage 212 that enable applications and functionality on the end-user devices 195.

Service endpoints 214 are provided in the cloud provider 140 to enable communication with the mid-link server 185 and end-user devices 195. Service endpoints 214 may include VPN terminations and proxies that provide for a secure tunnel with the mid-link server 185 and/or the end-user devices 195. The mid-link server 185 can optionally connect directly with services 216 and storage 212 of the cloud provider 140 without using the service endpoints 214. In some cases, the end-user device 195 communicates with the services 216 and the storage 212 through the mid-link server 185 depending on route preference and policies.

Figure 3:
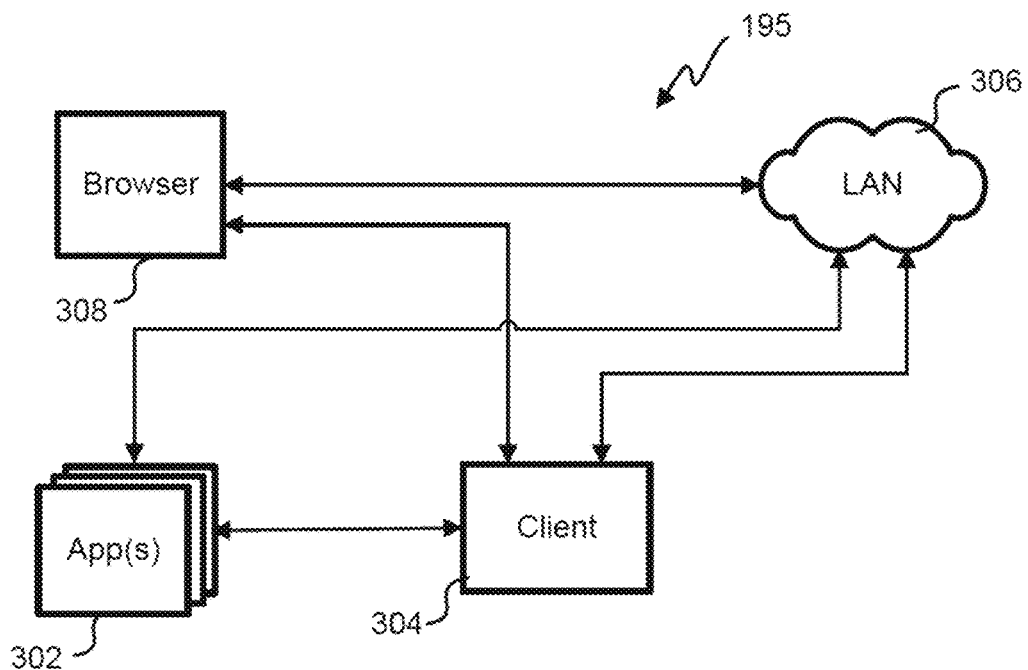
FIG. 3 illustrates a block diagram of an embodiment of an end-user device that includes a client for enabling enhanced routing control.

Referring next to FIG. 3, a block diagram of an embodiment of an end-user device 195 that includes a client 304 for enabling enhanced routing control is shown. The end-user device 195 includes one or more local application or applications (apps) 302 and a browser 308 that use the client 304 for communication over the LAN 306 and ultimately to the cloud providers 140 (not shown). The browser 308 and the apps 302 can be redirected using domain name services (DNS) to use the client 304. Alternatively, the browser 308 and the apps 302 may natively support the client 304 to utilize Application Programming Interfaces (APIs) or other communication to select policies and receive the corresponding user groups and/or user profiles.

Figure 4:
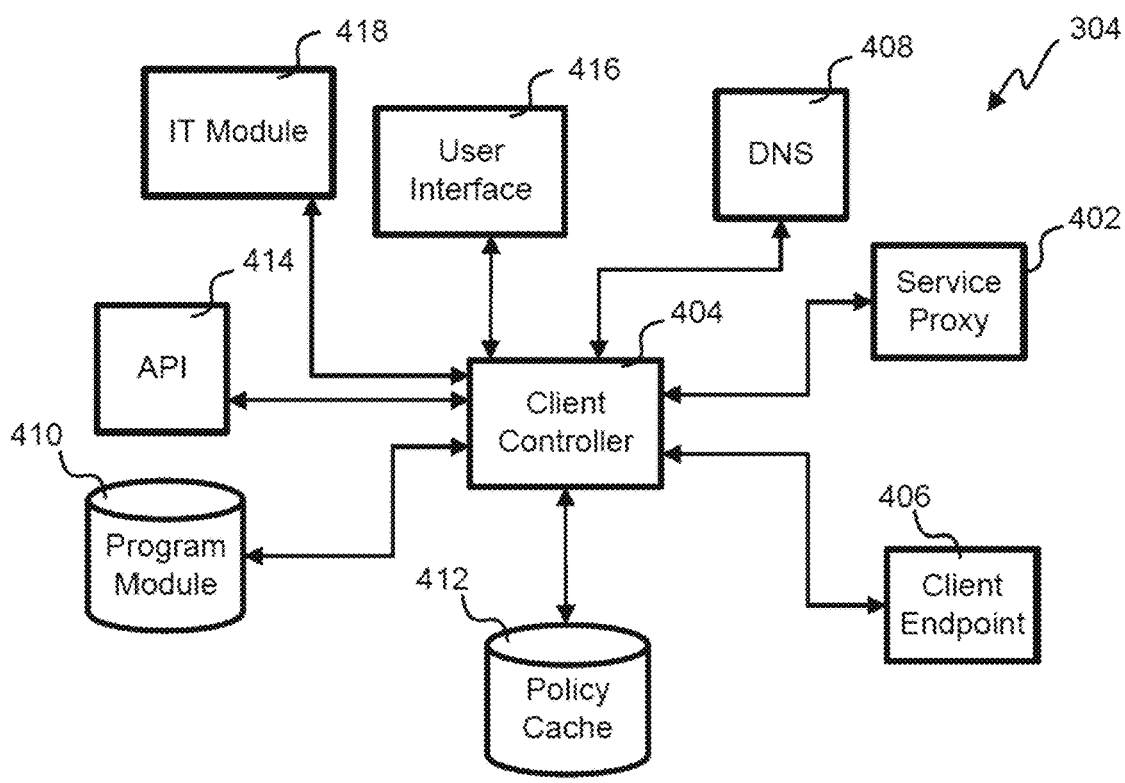
FIG. 4 illustrates a block diagram of an embodiment of a client.

Referring next to FIG. 4, a block diagram of an embodiment of a client 304 is shown that can specify by the policies, and provide user directory information for example, email address, User Principal Name (UPN), and/or username which specifies grant to cloud services under the management of a client controller 404. The client controller 404 configures a DNS, fulfills API request, populates routes, specifies user and/or group policies, acquires the user directory information from a user interface 416, and a policy cache 412 for selection of the user and/or group policies. In operation, the client controller 404 configures data and service requests over the cloud network 100.

The user interface 416 is a python Command Line Interface (CLI) tool using a SCIMClient class of a program module 410 that allows administrators to create POC SCIM integrations or manage the existing SCIM integrations easily. The CLI tool is an executable tool available in Mac® Operating System and Windows® endpoints that can run in the most popular terminal applications available. The user interface 416 leverages the program module 410. The SCIM Client is a protocol client as a website or an application that uses the SCIM protocol to manage identity data maintained by the SCIM service provider (mid-link server 185). The SCIM Client initiates SCIM (REST Hypertext Transfer Protocol (HTTP)) requests to a target SCIM service provider.

The client 304 can be specified for use with a DNS 408 who redirects traffic from browsers 308 and the apps 302 to go through the client 304. Without changing any apps 302 or the browser 308, the client 304 can process traffic for the cloud network 100. The client 304 can operate as a proxy using a service proxy 402 or a VPN using the client endpoint 406. An API 414 is provided for the apps 302 to configure the client 304 if they have that capability. The mid-link server 185 can also configure the client 304.

The mid-link server 185 sends relevant policies to the policy cache 412 to provide functionality to the client 304. The policies allow specifying the user and/or group configuration and the user directory synchronization for the client 304 to use. The user directory synchronization provides group-based reporting, group-based steering/access to specific Software as a Service (SaaS) applications, websites, private applications, group-based real-time or API-enabled policies, group-based client configurations and group-based role-based access control (RBAC) controls, other features like user-based policies scale easily up with the deployment of directory synchronization services.

Table 1 gives examples of policies along with the users and the groups as deployed by the mid-link server 185.

TABLE 1

| User-name | Email | User Principal Name (UPN) | Group | Policies |
|---|---|---|---|---|
| User01 | user01@abc.com | user01@domain.com | Group 01 | Policy 1 |
| User02 | user02@abc.com | user02@domain.com | Group 02 | Policy 2 |
| User03 | user03@abc.com | user03@domain.com | Group 03, Group 01 | Policy 3 |
| User04 | user04@abc.com | user04@domain.com | Group 04 | Policy 4 |

For example, policy 1 specifies username, email, UPN, and group of User01. The policy 1 specifies access to specific websites and blocks social media. Policy 2 specifies policies for User02 like access to emails outside the enterprise, Multi-factor Authentication (MFA) and VPN connection. User03 is a member of group 03 and group 01 and policies of both the groups are applicable to the user03 and are included in policy 3. For example, social media access via the policy of group 03 and VPN access and blocked access to restricted countries by the policy of group 01. Policy 4 dictates the policies such as group email access, email to recipients outside the recipient and remote access to enterprise server.

The program module 410 includes a software logic that helps in integration with external or third party solutions for the domain and the enterprise 198 by the mid-link server 185. The program module 410 includes a python module with a SCIMClient class, which facilitates integrations with the third party solutions. The third party solutions are other than the currently supported ones such as Microsoft Azure® Active Directory (AD) or OKTA® as partner IdPs.

An Information Technology (IT) module 418 provides the administrators of the enterprise 198 to enable and/or disable the user policies and/or group policies. Access to particular websites, the cloud services 140, and/or access to features within a software of the enterprise 198. Alerts related to threat are indicated to the end-user 204 via the user interface 416 by the administrators using the IT module 418.

Where non-compliance with the policy is determined from the mid-link server 185, the administrator generates the suggestions to remediate the problem and displays it to the end-user 204 for review. The end-user 204 can initiate remediation that is performed by the mid-link server 185.

Figure 5:
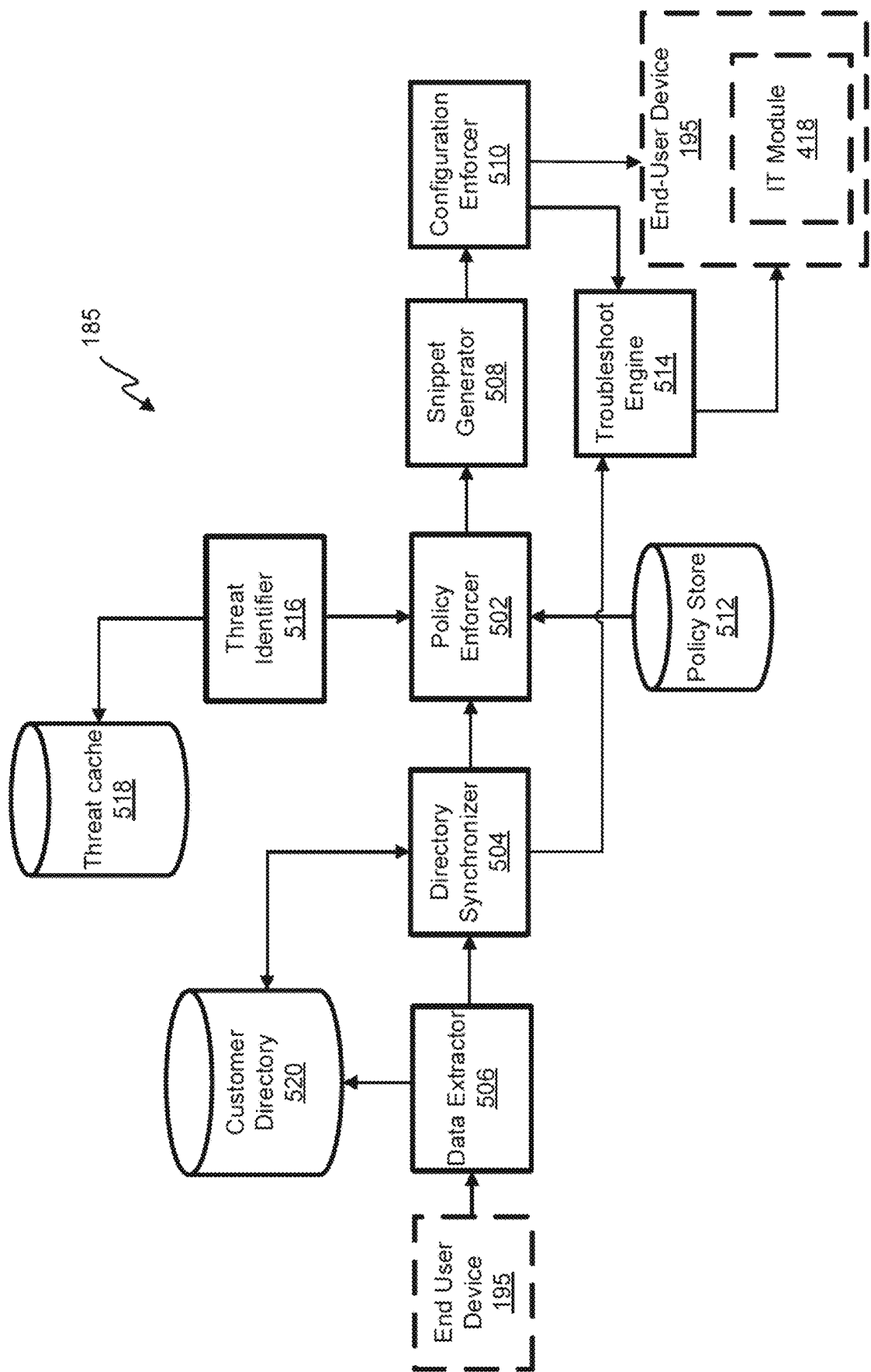
FIG. 5 illustrates an overview of a block diagram of an embodiment of a mid-link server.

Referring next to FIG. 5, an overview of a block diagram of an embodiment of a mid-link server 185 is shown. The mid-link server 185 includes a policy enforcer 502, a directory synchronizer 504, a data extractor 506, a snippet generator 508, a configuration enforcer 510, a policy store 512, a troubleshoot engine 514, a threat identifier 516, a threat cache 518, and a customer directory 520. A security analyst and a network operator have access to analysis performed at the mid-link server 185 via the IT module 418. Systems of the security analyst and the network operator are interconnected to the mid-link server 185 via the Public Internet 125. In another embodiment, the security analyst and the network operator can be interconnected through a Local Area Network (LAN) of an enterprise. The security analyst and the network operators can perform remedial actions on the threat detected by the threat identifier 516 based on the policies associated with the end-user device 195.

The dashed line used in the figure for representing the end-user device 195, and the IT module 418 indicate that the components are not a part of the mid-link server 185 and is used in the figure for illustrating inputs/outputs to/from the end-user device 195 and the IT module 418. Similar representations used in other block diagrams signify the same illustration.

The data extractor 506 pulls the end-user's 204 directory information including a number of user attributes for configuration of a user directory. The user attributes include email address, User Principal Name (UPN), first name, last name, and/or username of the end-user 204. The user attributes are stored in the customer directory 520. One or more end-user(s) 204 of the end-user device(s) 195 can also provide the directory information for configuration. The user attributes can also be provided by the administrator of the enterprise(s) 198 of the end-users 204 or a Human Resource system of the enterprise(s) 198. The end-users 204 can either provide their respective user attributes via configuration files and text files such as comma-separated values (CSV) files or manually provide to the tool as parameters. The customer directory 520 is a repository of the customers that is the end-user's 204 directory information which can be retrieved later by other components of the mid-link server 185 for further analysis.

The configuration files are represented as scimclient.conf, a SCIM client configuration file hosted in the same folder as the SCIM client module file that defines the connected tenant relevant FQDN (Fully Qualified Domain Name), Organization ID and OAuth SCIM Token parameters.

The CSV files are a set of CSV files hosted in subfolder csv_files relative to the SCIM client module file and are used to define the user attributes or SCIM parameters required by some commands (SCIM users and groups details) or users manually created in the user interface 416.

The directory synchronization 504 updates the end-user's 204 directory information based on a comparison of the information from the customer directory 520 with the end-user's 204 directory information acquired from the data extractor 506. For example, for the end-user 204 providing the user attributes for the first time, the customer directory 520 cannot be updated with the user attributes. In such cases, the directory synchronizer 504 updates the customer directory 520 to reflect the most recent user attributes of the end-users 204.

The policy enforcer 502 retrieves the policies from the policy store 512. The policy store 512 includes the policies specific to the requirements of the end-users 204 and the groups of the end-users 204. The policies are determined by the policy enforcer 502 based on the role of the end-user 204, the tenant or enterprise 198 of the end-user 204, the group or the team associated with the end-user 204 and/or other user and entity behavior analytics (UEBA), source/ destination, geographical location of the end-users 204, or user connection. The policies are also based on the groups of the end-user 204. The policy enforcer 502 further receives threat information from the threat identifier 516 and filters the policies (if required) based on the threat information.

The threat identifier 516 identifies the threat information related to a malicious, an anonymous, or an unidentified user activity that can create vulnerability and threat to data security within the enterprise 198. The end-user 204 associated with the threat is identified as a high-risk user or a risky user. The threat identifier 516 is coupled with the program module 410 which extracts real-time threat information based on user activities from an external application or a third party solution. For example, a SOAR (Security Orchestration, Automation and Response) platform detects that an end-user 204 is the high-risk user.

The threat identifier 516 classifies the threat based on a level of threat associated with the threat in the threat cache 518. The level of threat is proportional to the vulnerability caused by the threat to the end-user device 195, to the enterprise 198 network and/or the data security within the enterprise 198. Remediations associated with the threat is also stored along with the previously identified threats. If the threat identifier 516 is unable to track the threat in the threat cache 518, possibly because it is being detected for the first time or is the unidentified threat, the threat is entered in the threat cache 518. For example, remediations can include using the SCIMClient class or the CLI tool to add the risky end-user 204 to a specific existing SCIM group with less privileges in the configuration and remove it from that group when the threat that the high-risk user represents is remediated.

The policy enforcer 502 filters the policies based on the threat information. Further, the policy enforcer 502 resolves any conflict or anonymity between the user and the group specific policies. For example, a user policy may require access to the VPN during a specific time interval (for example, 9 am to 6 pm) after which the access is denied. However, a group policy may require access to the VPN after 6 pm. This conflict between the policies is resolved and based on a priority of the work to be done by the end-user 204 and/or the specific user or group requirement, the policies are adjusted, and the access is allowed after 6 pm. However, the access is granted till the group requirement is accomplished after which the usual policies are applied. In an embodiment, the policy enforcer 502 may block certain websites as part of the remediation or an updated policy. If there are no conflicts, then resolution is not required.

The policy enforcer 502 can also add the high-risk user 204 to a high-risk group with a lower set of privileges in configuration for the end-user 204. However, the other end-users 204 not identified as the high-risk end-users 204 are assigned a higher set of privileges. The filtered user and/or the group policies along with the identification of the end-user 204 as the high-risk user is provided to the snippet generator 508.

The snippet generator 508 creates a snippet of the end-user's 204 directory without any software or hardware requirement in POCs or production activations based on the user and/or the group policies. The snippet is integrated with the user interface 416 and is created using the CLI tool. The snippet is created to implement the end-user's 204 directory.

The configuration enforcer 510 deploys the end-user's 204 directory via the app 302 on the end-user device 195. The end-user's directory is configured and displayed on the end-user device 195 for the end-user 204. The configuration enforcer 510 further provides details of the deployed end-user's 204 directory to the IT module 418 and the troubleshoot engine 514 for further inspection and/or analysis. Different configurations are deployed based on the user and/or the group policies.

The troubleshoot engine 514 checks or troubleshoots the directory synchronizations in production environments. The troubleshoot engine 514 is coupled with the SCIM client CLI tool of the user interface 416 that can help troubleshoot production SCIM integrations and also troubleshoot directly in the customer's environment. For example, if the end-user device 195 doesn't get enabled due to incorrect userName attribute, the troubleshoot engine 514 uses the CLI tool to compare the userName attribute with the command prompt output seen on the affected devices. The problem arising due to the incorrect userName attribute is identified and remediated accordingly.

By way of an example, incorrect steering configuration or client configuration, and real-time protection policies that are not applied on the end-user devices 195 are identified. The CLI tool can help create a test SCIM user added to the same SCIM groups as the affected users. This can help the support engineers or the administrators to reproduce the customer issue in their tenant quickly and take the appropriate next steps. In another example, the issues with the backend server or the mid-link server 185 are detected. The CLI tool can help to quickly compare the number of SCIM users and groups retrieved from the representational state transfer (REST) API, against the number of users and groups seen in the tenant User Interface that is the user interface 416. If the numbers match, a pointer indicates by pointing to internal databases inconsistencies in the mid-link server 185.

Other problems associated with policies enforcement, and directory synchronization are identified and remediated by the troubleshoot engine 514. The troubleshoot engine 514 provides results of the troubleshooting performed to the IT module 418 for further analysis or control.

Figure 6:
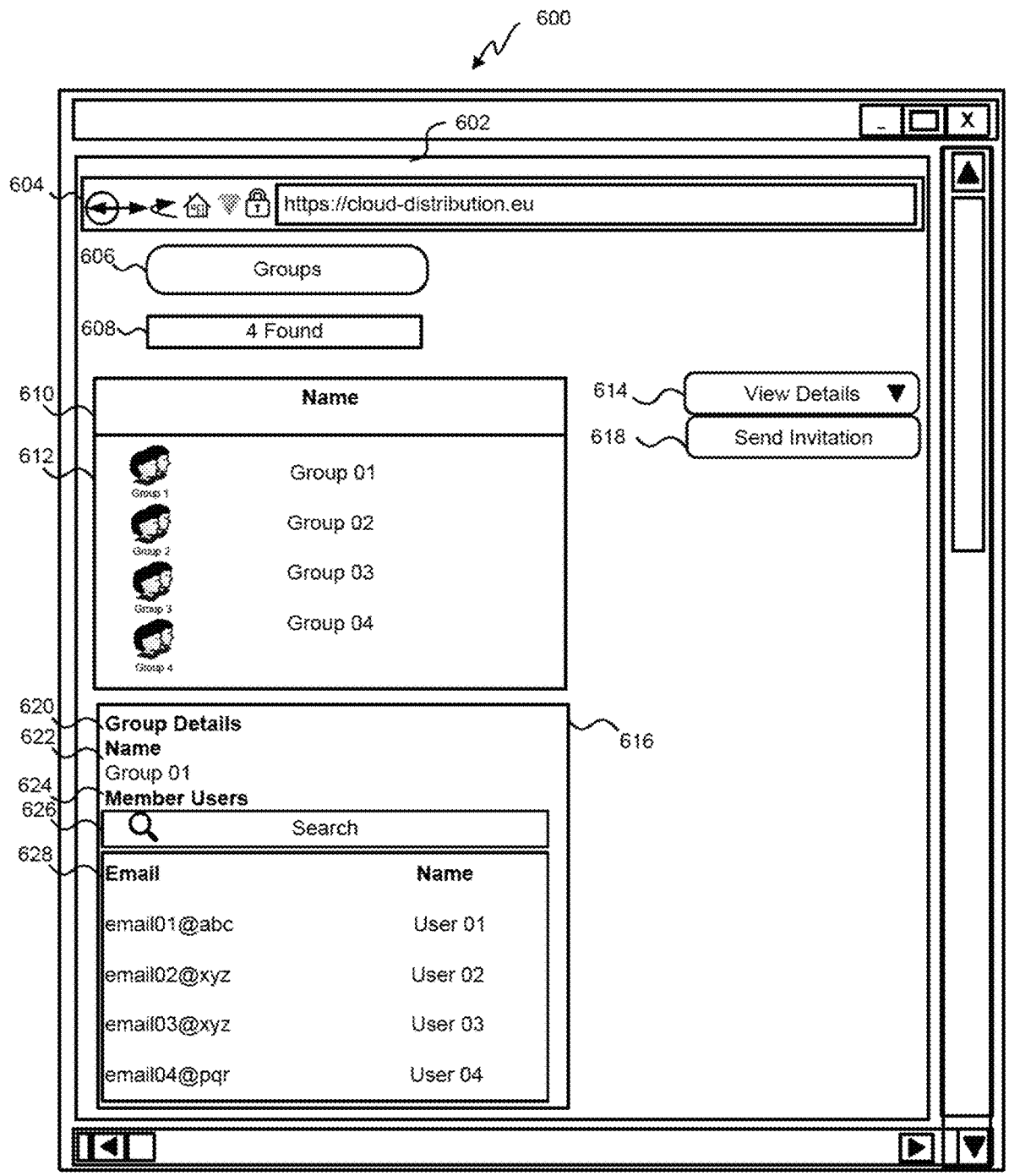
FIG. 6 illustrates a Graphical User Interface (GUI) of a group configuration of the end-user.

Referring next to FIG. 6, a Graphical User Interface (GUI) 600 of a group configuration of the end-user 204 is shown according to some embodiment of the present disclosure. The GUI 600 includes a tenant user interface 602 that is displayed to the end-user 204 via the user interface 416. Subsection 604 indicates a weblink used to access the tenant UI 602. Button 606 displays groups for the end-user 204. On clicking the button 606, number of groups for the end-user 204 are displayed in a subsection 608. For example, four groups namely, group 01, group 02, group 03, and group 04 are found for the end-user 204 which are displayed in a subsection 612 of a section 610. Details of these groups can be viewed by selecting from a view details tab 614. For example, by clicking on the group 01, the details of the group 01 are displayed in a section 616. Invitations for joining a group can be send to the end-user 204 (not present in the group 01) and/or other end-users 204 who need to be added to the group using a send invitation tab 618. The section 616 displays group details 620 including name of the group 622 which is group 01 in this case. Members of the group 01 are displayed via a member users subsection 624. The members can be searched using a search field 626. The members email and name are displayed as the details in a subsection 628.

Figure 7:
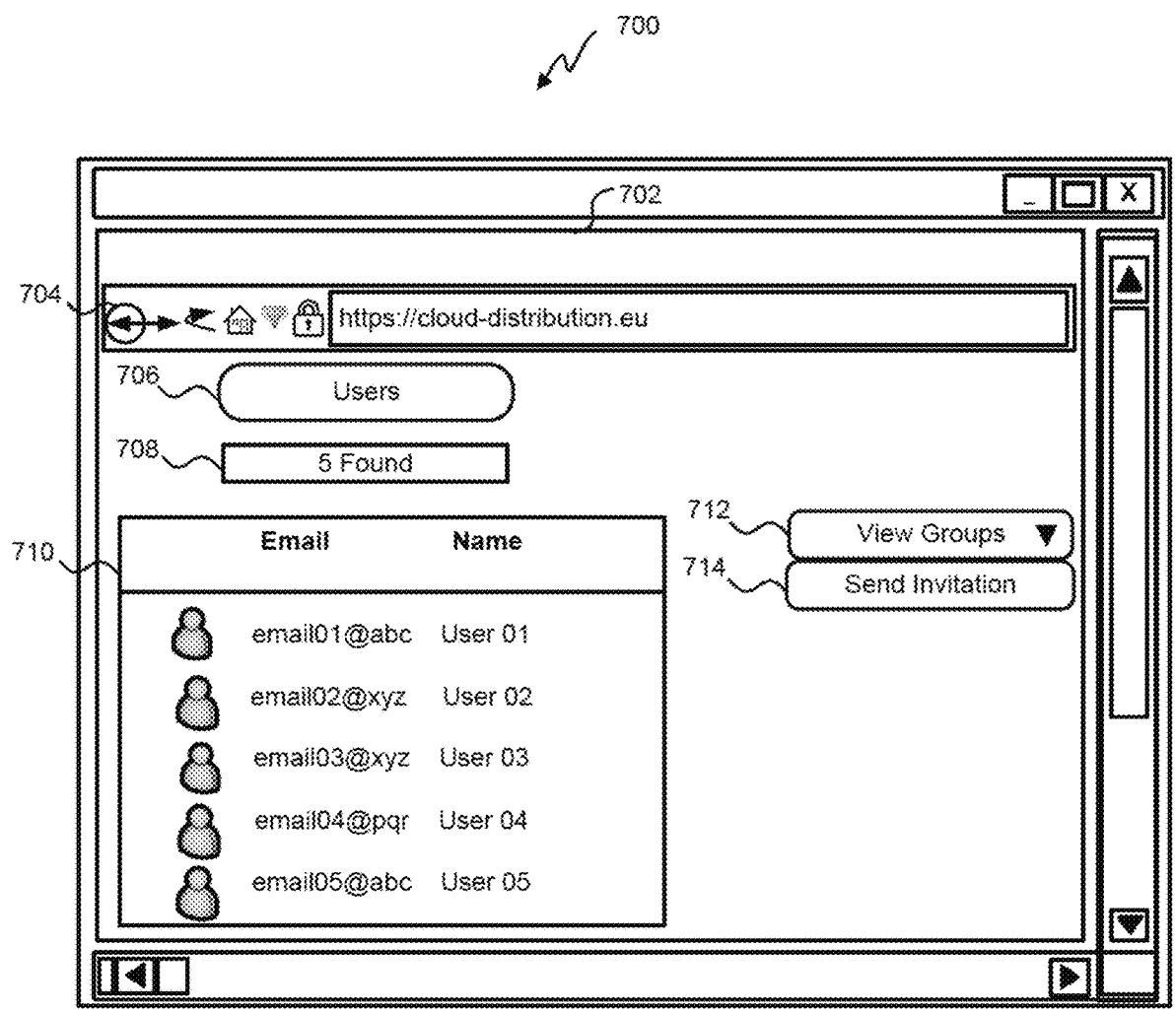
FIG. 7 illustrates a Graphical User Interface (GUI) of a user configuration of the end-user.

Referring next to FIG. 7, a Graphical User Interface (GUI) 700 of a user configuration of the end-user 204 is shown. The GUI 700 includes a tenant user interface 702 that is displayed to the end-user 204 via the user interface 416. Subsection 704 indicates a weblink used to access the tenant UI 702. Button 706 displays users that are already configured using the tenant UI 702. On clicking the button 606, number of users for the end-user 204 are displayed in a subsection 708. For example, five users namely, user 01, user 02, user 03, user 04, and user 05 are found which are displayed in a subsection 710. The user's email and name are displayed in the subsection 710. Groups associated with these users can be viewed by selecting from a view users tab 712. Invitations related to configurations of the end-user 204 and/or other end-users 204 can be send to the respective users using a send invitation tab 714.

Figure 8:
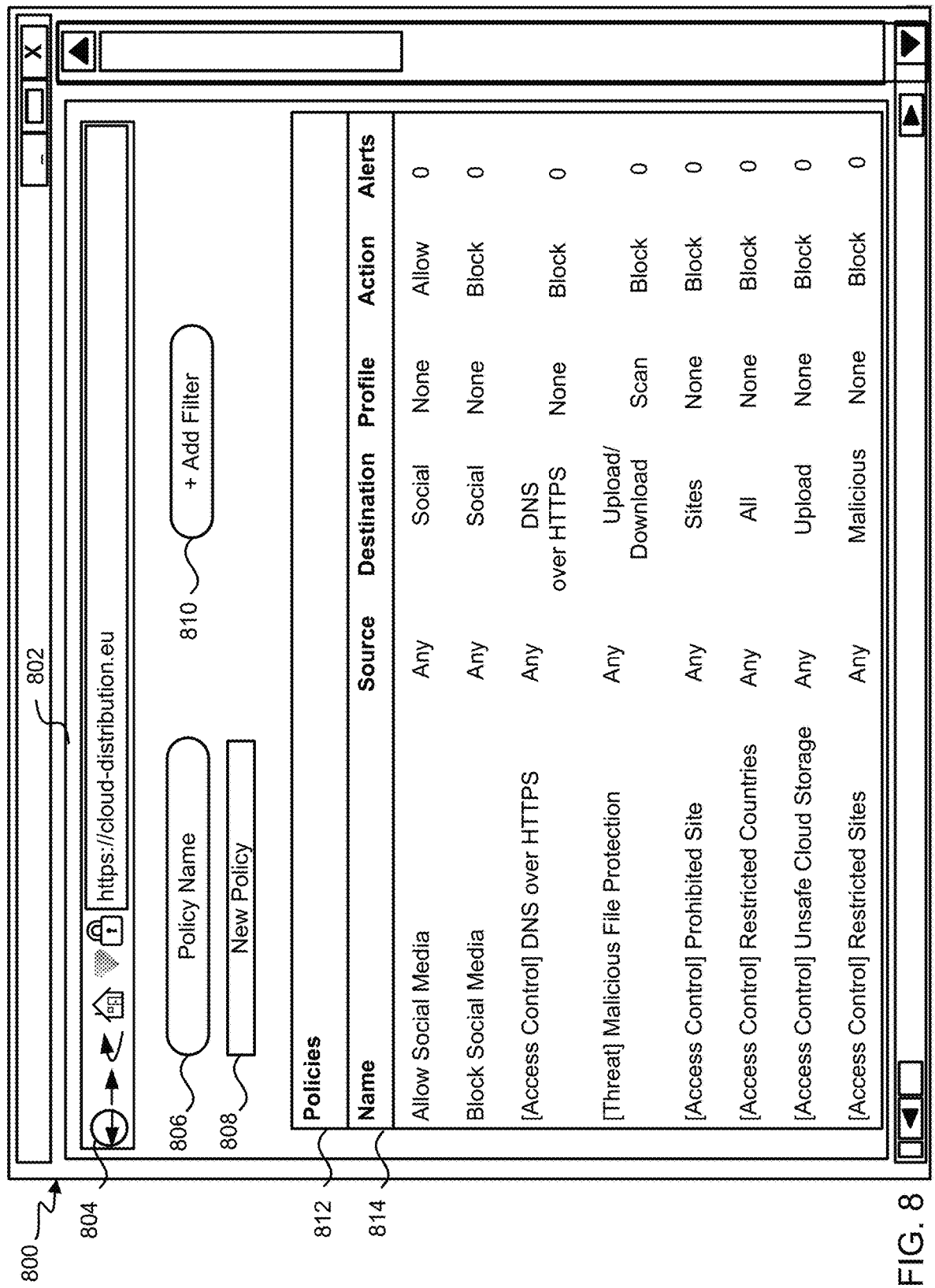
FIG. 8 illustrates a Graphical User Interface (GUI) for policy assignment of the end-user.

Referring next to FIG. 8, a Graphical User Interface (GUI) 800 for policy assignment of the end-user 204 is shown. The GUI 800 includes a user interface 802 that is displayed to the end-user 204 via the user interface 416 and the administrators for assigning policies to the end-user 204. Subsection 804 indicates a weblink used to access the user interface 802. Policy name for the policies to be assigned to the end-user 204 is displayed using a policy tab 806. Any new policy can be added using a new policy tab 808. The policies may be filtered by adding a filter using an add filter button 810. The policies are displayed in a policy subsection 812. Name, source, destination, profile, action and alerts of the policies are displayed in a subsection 814. For example, a policy that allows social media access from any source and destination with no restriction on user profile like employee or vice president. No alerts related to the malicious use of the social media by the end-user 204 has been reported so far which is indicated in the subsection 814 as zero.

Figure 9:
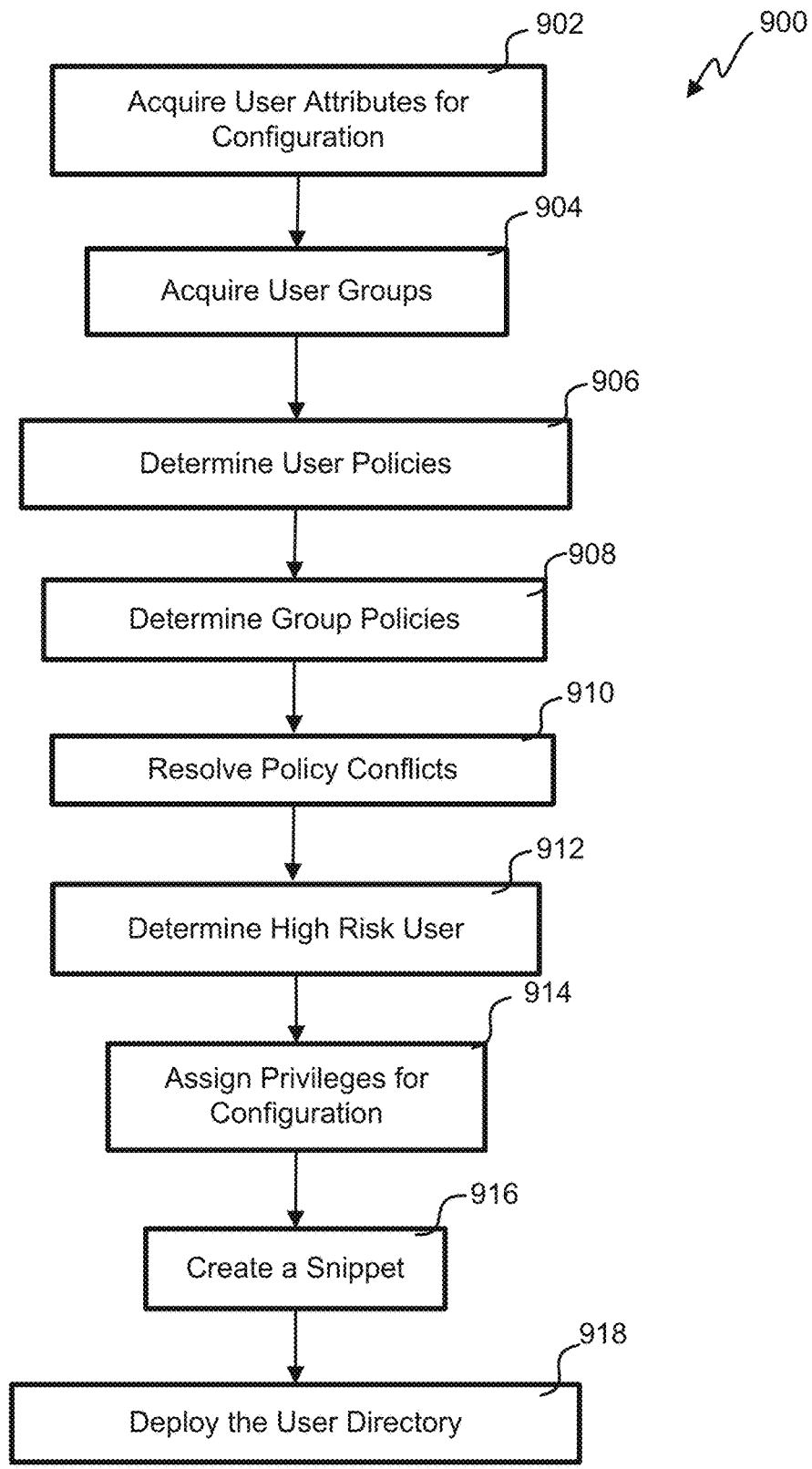
FIG. 9 illustrates a flowchart of an embodiment of a provisioning process for user and group profiles using directory synchronization in a multi-tenant system.

Referring next to FIG. 9, a flowchart of an embodiment of a provisioning process 900 for user and group profiles using directory synchronization in a multi-tenant system is shown. The depicted portion of the process begins at block 902 where an end-user 204 of the end-user device 195 loads browser or a remote application at the end-user device 195. The end-user 204 provides user attributes for configuration of an end-user profile and a group profile for the end-user 204. The user attributes are username, email, first and last name of the end-user 204. The user attributes are provided via the user interface 416 which is a CLI tool and works with the program module 410 for creating the user directory of the end-user 204. In another embodiment, an administrator of the enterprise 198 of the end-user 204 can also provide the user attributes.

An abstraction layer allows the administrators of the enterprise 198 to interact with the mid-link server 185 using the user attributes displayed in the user interface 416 such as email address and display name for groups. When using REST API calls alone, the interaction is based on SCIM IDs which are 128-bit numbers and are far more complex. When a user or group is created by the mid-link server 185, it returns to the user interface 416, a SCIM ID for the object created which is then referenced afterwards by the end-user 204 to perform tasks over it. The program module 410 includes a logic to provide the abstraction layer and have the administrators focusing on much more friendly parameters.

Having a tool built-in with all the parameters to perform the required Hypertext Transfer Protocol (HTTP), API calls requiring few parameters to be entered is far easier than building custom HTTP API calls with state-of-the-art software products (Postman, curl, wget, etc.)

Some commands supported by the SCIM Client project like "delete all SCIM users" or "delete all SCIM groups" are simply not possible without some logic on top of performing custom HTTP API calls.

At block 904, groups associated with the end-user 204 can either be determined by the mid-link server 185 or by an administrator of the enterprise 198 of the end-user 204 or can be manually set by the end-user 204 through the user interface 416. The groups can be based on a role of the end-user 204 in the enterprise 198 such as grade two level employee, manager, vice-president or receptionist. The group can be based on a work profile of the user such as analyst, administrator, developer or technician. The group can be further based on a rank of the end-user 204 such as vice-president, director or manager can have separate group. The end-user 204 can be a member of more than one group.

At block 906, user policies associated with the end-user 204 are determined by the mid-link server 185. The user policies are based on a user role, a user designation, a work profile, source and destination of the end-user 204, VPN, UEBA information of the end-user 204, user's geographical location, a user residency, and/or a user connection.

At block 908, group policies associated the group(s) of the end-user 204 are determined by the mid-link server 185. The group policies are based on the user role of each of the members of the groups, a team of the members, the user designation of the members, geographical location of members of the groups, the work profile of the members of the groups, UEBA information of the members, and/or the user connection of each of the members.

At block 910, conflicts related to the user policies and the group policies are resolved by the mid-link server 185. For example, the user policies can specify blocked social media accounts for the end-user 204. However, the group policies can specify access to one of the social media accounts for some demonstration work. The conflict between the user and the group policies are resolved providing access to a social media account based on the requirement. However, if there are no conflicts, then resolution is not required.

At block 912, high-risk users are determined based on threat information acquired from an external application or third party solution such as SOAR. The mid-link server 185 acquires the threat information and analyses the end-user 204 to determine whether the end-user 204 is a high-risk user or not.

At block 914, privileges are assigned to the end-user 204 based on whether the end-user 204 is the high-risk user or not. If the end-user 204 is the high-risk user, the end-user 204 is assigned a lower set of privileges in the configuration. For example, the end-user 204 can be blocked from using specific web sites or the VPN connection. The restrictions in access to the enterprise 198 server or the other services and/or websites are based on policies that are set against the high-risk users in the policy store 512. However, if the end-user 204 is not the high-risk user, the end-user 204 is assigned a higher set of privileges in the configuration. For example, the end-user 204 can be allowed access to the services and websites based on the user and the group policies as usual.

At block 916, a snippet of the configuration of the user directory for the end-user 204 is created. The user interface 416 allows the creation of the snippet which can be successfully integrate the user directory for the end-user 204.

At block 918, the user directory is deployed by the mid-link server 185 using the snippet based on the user and group policies. The user directory is quickly deployed without any software or hardware requirement in POCs or production activations which makes it easy for the sales engineer to generate sales and focus on customers. Different configurations are deployed based on the user and/or the group policies.

Figure 10:
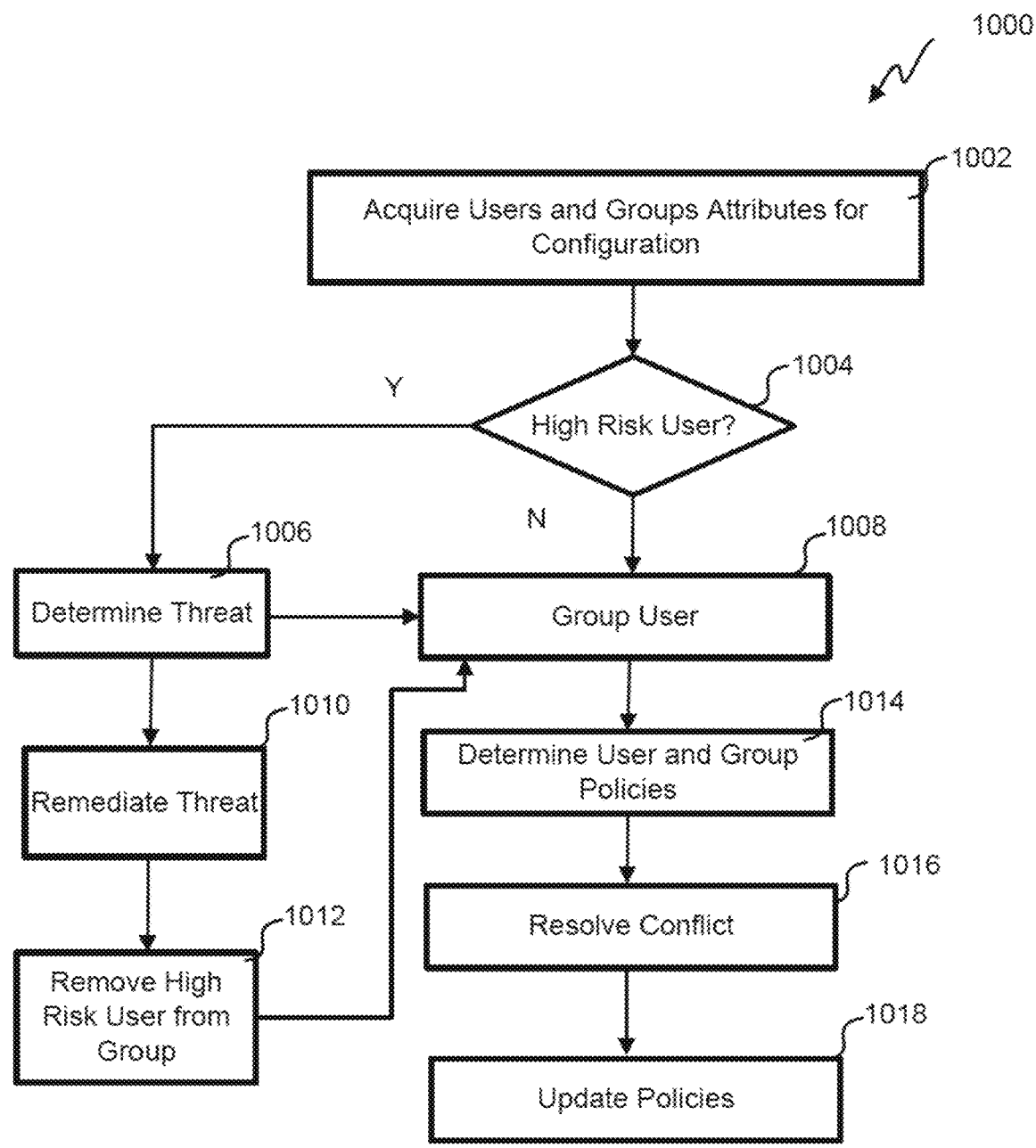
FIG. 10 illustrates a flowchart of an embodiment of a threat detection process 1000 which identifies high-risk users.

Referring next to FIG. 10, a flowchart of an embodiment of a threat detection process 1000 which identifies high-risk users is shown. The depicted portion of the process 1000 begins at block 1002 where user attributes are acquired from either the enterprise 198 or the end-user 204 for configuration of a user directory.

At block 1004, a determination of whether the end-user 204 is a high-risk user is made. A threat information including UEBA information is received from a third party application like SOAR or an external security application. Based on the threat information and UEBA information acquired by the mid-link server 185, it is determined whether the end-user 204 is the high-risk user or not. If the end-user 204 is the high-risk user, then at block 1006, a threat associated with the end-user 204 is determined based on a type of the threat. For example, a malicious activity or a pirated software installed by the end-user 204 at the end-user device 195 can cause a vulnerability to the end-user device 195 and the enterprise 198 network as well. A threat level associated with the type of threat is determined. The threat level can be compared with a threshold level like a random number assigned to the threat level based on severeness of the vulnerability that it causes. The threshold level is used to categorize the end-user 204 as the high-risk user. The end-user 204 is grouped at block 1006.

At block 1008, if the end-user 204 is the high-risk user, then the end-user 204 is grouped in a high-risk group with a lower set of privileges for configuration of the user directory. For example, the end-user 204 can be restricted use to the enterprise 198 for a specific duration until the threat is remediated. If the end-user 204 is not the high-risk user, then the end-user 204 is categorized in a group with a higher set of privileges for configuration. For example, the end-user 204 can have access to the enterprise VPN while the high-risk user cannot.

At block 1010, the threat associated with the high-risk user is remediated. Policies or rules associated with remediation of the threat can be identified from the policy store 512. For example, updating the anti-virus software at the end-user device 195 or upgrading system software.

At block 1012, after the threat is remediated, the end-user 204 is removed from the high-risk group and is moved to the group with the higher set of privileges for the configuration of the user directory at block 1008.

At block 1014, user policies and group policies are determined for the end-user 204. The user policies are based on a user role, a user designation, a user profile, source and destination of the end-user 204, VPN, UEBA information of the end-user 204, user's geographical location, a user residency, and/or a user connection. The group policies are based on the user role of the members of the groups, a team of the members, the user designation of the members, geographical locations of members of the groups, the work profile of the members of the groups, UEBA information of the members, and/or the user connection of the members.

At block 1016, any conflicts between applications of the user policies and the group policies are resolved. If the resolution cannot be done automatically, an administrator of the enterprise 198 of the end-user 204 or the end-user 204 can deal with the resolution of the conflict.

At block 1018, the user policies and the group policies are updated based on the resolution of the conflict. An updated policy is applicable for the end-user 204. The updated policy can be applicable till the application of the both the user policies and the group policies together. The enterprises 198 update the user policies and/or the group policies based on the resolution of the conflict. The policies within the enterprise 198 are also updated from time to time and thus the user policies and the group policies can also be updated accordingly.

Figure 11:
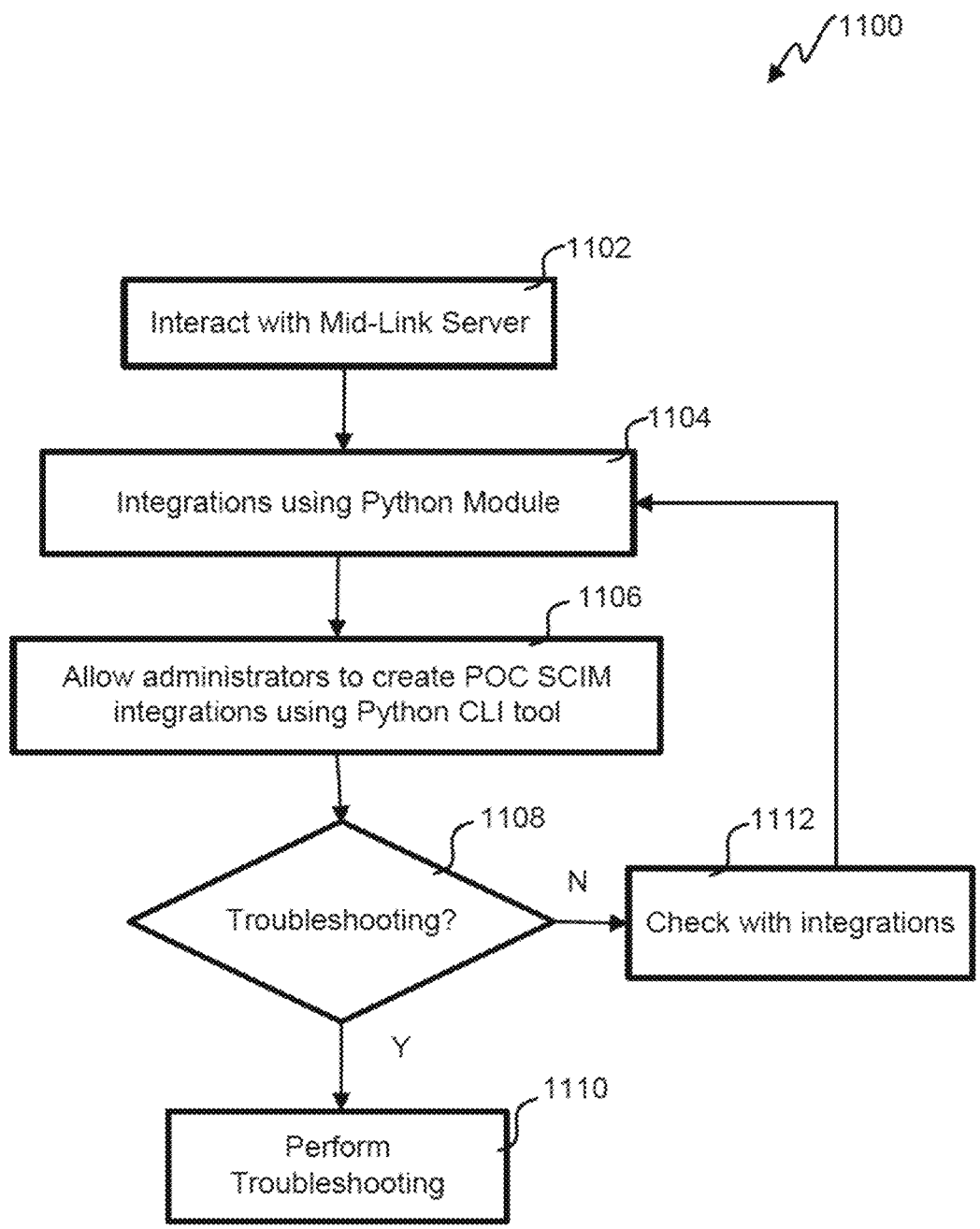
FIG. 11 illustrates a flowchart of an embodiment of a troubleshooting process.

Referring next to FIG. 11, a flowchart of an embodiment of a troubleshooting process 1100 is shown. The depicted portion of process 1100 begins at block 1102 where the end-user 204 provides user attributes via the user interface 416 and/or an administrator of the enterprise 198 provides the user attributes for configuration of a user directory for the end-user 204. The user attributes include username, email and/or UPN. The user interface 416 can be a python CLI tool. The user directory is configured by interacting of the end-user device 195 or an enterprise 198 agent with the mid-link server 185.

At block 1104, integration of a snippet of the user directory is performed using the program module 410 which can be a python module. The snippet is created by using the user interface 416 and providing the user attributes. The user directory is deployed by the mid-link server 185.

At block 1106, administrators of the enterprise 198 are allowed to create POC SCIM integrations using the python CLI tool or manage the existing SCIM integrations.

At block 1108, the mid-link server 185 determines whether the troubleshooting of the user directory synchronizations in production environments is required for the end-user 204. If the troubleshooting is required then at block 1110, troubleshooting is performed. The troubleshooting requires minimum technical skills. The python CLI tool can help to quickly address troubleshooting scenarios that customer experience and support teams often face. The troubleshooting is performed using CLI tool GET operations from the user interface 416. If the troubleshooting is not required then at block 1112, SCIM integrations are checked for a troubleshooting scenario and the process 1100 moves to block 1104.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A cloud network for automatically provisioning user and group profiles using directory synchronization in a multi-tenant system, the cloud network comprising:
 a plurality of end-user devices, wherein an end-user device of the plurality of end-user devices includes a local application and a user interface accessible by the plurality of end-user devices; and
 a mid-link server coupled to the plurality of the end-user devices, wherein the mid-link server comprises a hardware server and is configured to:
  create a snippet for a configuration of a user directory using the user interface for each of a plurality of end-users;
  retrieve user policies and group policies associated with the plurality of end-users from a policy store;
  receive from a threat identifier, threat information associated with an end-user;

filter the user policies or the group policies based on the threat information;

identify a high-risk user from the plurality of end-users based on the threat information and assign the high-risk user to a high-risk group with a lower set of privileges for the configuration of the user directory for the end-user; and provide the filtered user policies or the group policies with an identification of the high-risk user to a snippet generator;

deploy the user directory using the snippet, wherein the configuration of the user directory is based on the user policies and the group policies; and identify a conflict between the user policies and the group policies, wherein the user policies or the group policies are adjusted based on a priority of end-user tasks or specific user/group requirements to resolve the conflict between the user policies and the group policies.

2. The cloud network of claim 1, wherein the mid-link server is further configured to remediate a threat associated with the high-risk user.

3. The cloud network of claim 1, wherein the mid-link server is further configured to determine a plurality of policies based on factors including a role of the end-user, an enterprise of the end-user, an associated group of the end-user, a user and entity behavior analytics (UEBA), a source/destination, a geographical location of the end-users and a user connection.

4. The cloud network of claim 1, wherein a plurality of policies are dynamically adjusted based on changing threat information and user/group requirements automatically or by an administrator of an enterprise of the end-user.

5. The cloud network of claim 1, wherein the mid-link server is operable to adaptively configure directory synchronization based on real-time user behavior analytics.

6. The cloud network of claim 1, wherein the mid-link server is further configured to use machine learning algorithms for identifying policies and resolving the conflict.

7. The cloud network of claim 1, wherein the mid-link server is further configured to dynamically adjust configuration privileges of the end-user based on the threat information and user access patterns.

8. A method for automatically provisioning user and group profiles using directory synchronization in a multi-tenant system, the method comprising:

creating, by a mid-link server comprising a hardware server, a snippet for a configuration of a user directory using a user interface for each of a plurality of end-users, wherein the user interface is accessed by a plurality of end user devices;

retrieving, by the mid-link server, user policies and group policies associated with the plurality of end-users from a policy store;

receiving, by the mid-link server, from a threat identifier, threat information associated with an end-user;

filtering, by the mid-link server, the user policies or the group policies based on the threat information;

identifying, by the mid-link server, a high-risk user from the plurality of end-users based on the threat information and assign the high-risk user to a high-risk group with a lower set of privileges for the configuration of the user directory for the end-user; and providing, by the mid-link server, the filtered user policies or the group policies with an identification of the high-risk user to a snippet generator;

deploying, by the mid-link server, the user directory using the snippet, wherein the configuration of the user directory is based on the user policies and the group policies; and identifying, by the mid-link server, a conflict between the user policies and the group policies, wherein the user policies or the group policies are adjusted based on a priority of end-user tasks or specific user/group requirements to resolve the conflict between the user policies and the group policies.

9. The method of claim 8, further comprising remediating a threat associated with the high-risk user.

10. The method of claim 8, wherein a plurality of policies are determined based on factors including a role of the end-user, an enterprise of the end-user, an associated group of the end-user, a user and entity behavior analytics (UEBA), a source/destination, a geographical location of the end-users and a user connection.

11. The method of claim 8, wherein a plurality of policies are dynamically adjusted based on changing threat information and user/group requirements automatically or by an administrator of an enterprise of the end-user.

12. The method of claim 8, further comprising adaptively configuring the directory synchronization based on real-time user behavior analytics.

13. The method of claim 8, further comprising using machine learning algorithms for identifying policies and resolving the conflict.

14. The method of claim 8, further comprising dynamically adjusting configuration privileges of the end-user based on the threat information and user access patterns.

15. A cloud network for automatically provisioning user and group profiles using directory synchronization in a multi-tenant system, the cloud network collectively having code for:

creating, by a mid-link server comprising a hardware server, a snippet for a configuration of a user directory using a user interface for each of a plurality of end-users, wherein the user interface is accessed by a plurality of end user devices;

retrieving, by the mid-link server, user policies and group policies associated with the plurality of end-users from a policy store;

receiving, by the mid-link server, from a threat identifier, threat information associated with an end-user;

filtering, by the mid-link server, the user policies or the group policies based on the threat information;

identifying, by the mid-link server, a high-risk user from the plurality of end-users based on the threat information and assign the high-risk user to a high-risk group with a lower set of privileges for the configuration of the user directory for the end-user; and providing, by the mid-link server, the filtered user policies or the group policies with an identification of the high-risk user to a snippet generator;

deploying, by the mid-link server, the user directory using the snippet, wherein the configuration of the user directory is based on the user policies and the group policies; and identifying, by the mid-link server, a conflict between the user policies and the group policies, wherein the user policies or the group policies are adjusted based on a priority of end-user tasks or specific user/group requirements to resolve the conflict between the user policies and the group policies.

16. The cloud network of claim 15, further comprising remediating a threat associated with the high-risk user.

17. The cloud network of claim 15, wherein a plurality of policies are determined based on factors including a role of the end-user, an enterprise of the end-user, an associated group of the end-user, a user and entity behavior analytics (UEBA), a source/destination, a geographical location of the end-users and a user connection.

18. The cloud network of claim 15, wherein a plurality of policies are dynamically adjusted based on changing threat information and user/group requirements automatically or by an administrator of an enterprise of the end-user.

19. The cloud network of claim 15, further comprising adaptively configuring directory synchronization based on real-time user behavior analytics.

20. The cloud network of claim 15, further comprising dynamically adjusting configuration privileges of the end-user based on the threat information and user access patterns.

\* \* \* \* \*